United States Patent [19]

Okada

[11] Patent Number: 5,014,415
[45] Date of Patent: May 14, 1991

[54] MANUFACTURING METHOD OF A DETECTOR USING RESISTANCE ELEMENTS

[75] Inventor: Kazuhiro Okada, Ageo, Japan
[73] Assignee: Wacoh Corporation, Ageo, Japan
[21] Appl. No.: 526,837
[22] Filed: May 22, 1990

[30] Foreign Application Priority Data

May 29, 1989 [JP] Japan .................. 1-135539

[51] Int. Cl.⁵ .......................................... H01C 17/00
[52] U.S. Cl. ....................... 29/621.1; 29/412; 73/726
[58] Field of Search ........... 29/621.1, 412; 338/4, 338/5, 47; 73/720, 721, 726, 727, 517 R, 862.04, 862.65

[56] References Cited

U.S. PATENT DOCUMENTS

| | | | |
|---|---|---|---|
| 4,188,258 | 2/1980 | Mounteer et al. | 29/621.1 |
| 4,454,771 | 6/1984 | Shimazoe et al. | 73/862.68 |
| 4,649,363 | 3/1987 | Starr | 338/4 |
| 4,771,639 | 9/1988 | Saigusa et al. | 29/621.1 |
| 4,773,972 | 9/1988 | Mikkor | 29/621.1 |
| 4,891,985 | 1/1990 | Glenn | 73/517 R |

Primary Examiner—P. W. Echols
Attorney, Agent, or Firm—Ladas & Parry

[57] ABSTRACT

A first substrate having a working region, a flexible region, and a fixed region is prepared. Resistance elements are formed within the flexible region on a first surface of this substrate. A portion of the first substrate is removed. Thus, the flexible region is allowed to have flexibility. A second substrate is connected to a second surface of the first substrate. The second substrate is cut later into two portions of a working portion and a pedestal. The working portion is connected to the working region of the first substrate, and the pedestal is connected to the fixed region of the first substrate. In order to control displacements in upward and downward directions of the working portion, control substrates are further connected. A force applied to the working portion by acceleration or magnetism is detected as changes in the resistance values of the resistance elements.

5 Claims, 13 Drawing Sheets

F I G. 4a
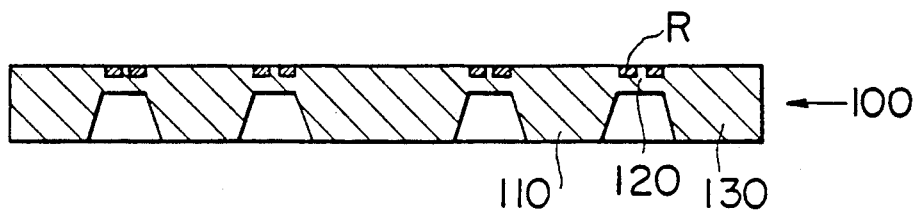
F I G. 4b
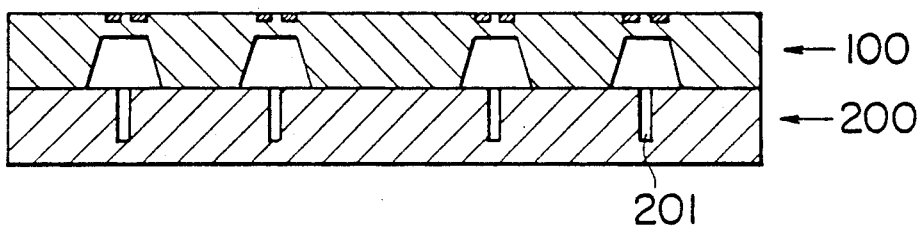
F I G. 4c
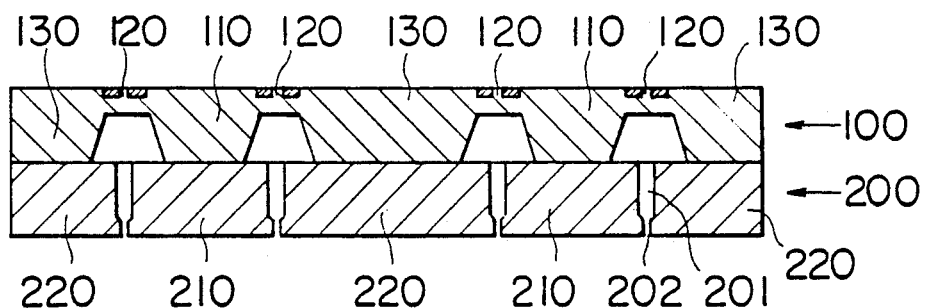
F I G. 4d
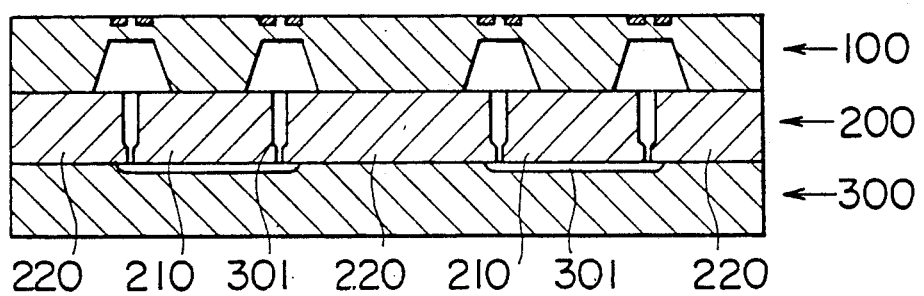

F I G. 12a
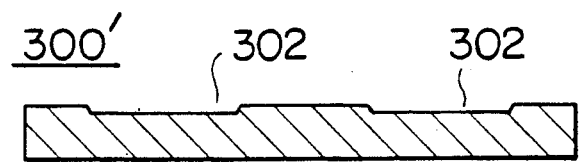
F I G. 12b
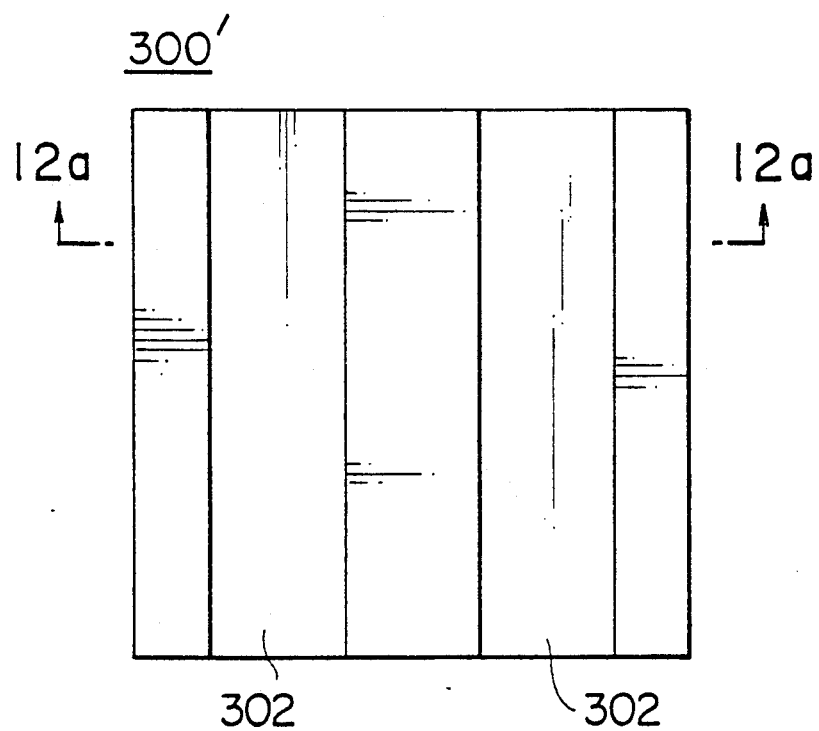

MANUFACTURING METHOD OF A DETECTOR USING RESISTANCE ELEMENTS

BACKGROUND OF THE INVENTION

This invention relates to a method of manufacturing a sensor using resistance elements and, more particularly, to a method of manufacturing a sensor for detecting, as changes in electric resistance, a mechanical deformation applied to resistance elements formed on a semiconductor substrate.

As a sensor for force, acceleration, or magnetism, etc., there have been proposed novel sensors in which resistance elements are formed on a semiconductor substrate to allow these resistance elements to produce machanical deformations by force, acceleration or magnetism, etc. applied, thus to detect such mechanical deformations as changes in electric resistance values. For example, in the Official Gazette of the International Laid Open No. WO88/08522 of the International Application based on the Patent Cooperation Treaty, there is disclosed a detector for force, acceleration or magnetism using resistance element which has been invented by the same inventor as the inventor of this application.

For manufacturing such a sensor, an impurity diffusion process, etc. is implemented to a semiconductor wafer to form a large number of resistance elements at respective predetermined positions. Also many chemical or physical processes are implemented to form grooves for rendering flexibility, and to form wiring layers. The semiconductor wafer is then cut into a plurality of semiconductor pellets by a dicing process. Each pellet serves as a main unit of a single independent force sensor. Thereafter, a weight body is connected to a working portion of the pellet in the case of manufacturing an acceleration sensor, and a magnetic body is connected thereto in place of the weight body in the case of manufacturing a magnetic sensor. Finally, this pellet is accommodated into a package and is then subjected to wire bonding. Thus, a chip is completed as a sensor unit.

In the above-described conventional manufacturing method, at the stage for processing a semiconductor wafer, processing can be implemented at the same time to a plurality of sensor units formed on a single wafer. However, after the wafer is cut off by a dicing process, it is required to separately process respective units. For example, weight bodies are required to be connected to every unit in the case of the acceleration sensor, and magnetic bodies are required to be connected to every unit in the case of the magnetic sensor. In addition to the above, pedestals for supporting respective pellets must be connected every unit. Further, it is also required to connect, every unit, control members for allowing the weight body or the magnetic body not to move exceeding an allowed range in order to prevent the semiconductor substrate from being mechanically broken when a large force is applied to the weight body or the magnetic body. As stated above, the conventional manufacturing method has many process steps which should be processed on every pellet, resulting in a poor efficiency and a lowered productivity. Namely, the conventional method has the problem that it is not suitable for mass production, resulting in an increased cost of products.

SUMMARY OF THE INVENTION

With the above in view, an object of this invention is to provide a manufacturing method capable of efficiently mass-producing sensors using a resistance element.

The first invention resides in a method of manufacturing a sensor using resistance elements, comprising:
a step of defining, on a first substrate, a working region, a fixed region, and a flexible region positioned therebetween,
a step of forming a resistance element within the flexible region of a first surface of the first substrate,
a step of partially removing said first substrate in order to allow the flexible region to have flexibility,
a step of connecting a second substrate to a second surface of the first substrate, and
a step of cutting the second substrate to thereby form a working body connected to the working region of the first substrate and constituted by a portion of the second substrate, and a pedestal connected to the fixed region of the first substrate and constituted by a portion of the second substrate.

The second invention of this application resides in a method of manufacturing a sensor using resistance elements, comprising:
a step of defining a plurality of unit regions on a first substrate, and defining, within each unit region, a working region, a fixed region, and a flexible region positioned therebetween,
a step of forming resistance elements within respective flexible regions on a first surface of the first substrate,
a step of partially removing the first substrate in order to allow the respective flexible regions to have flexibility,
a step of connecting a second substrate to a second surface of said first substrate,
a step of cutting said second substrate to thereby form, within each unit region, a working body connected to the working region of the first substrate and constituted by a portion of the second substrate, and a pedestal connected to the fixed region of the first substrate and constituted by a portion of the second substrate, and
a step of cuting off the first and second substrates every unit regions to form independent sensors, respectively.

The third invention of this application is characterized in that, in the above-mentioned second invention, before the substrate is cut off every unit regions, a groove such that the working body can move therein with a predetermined degree of freedom is further formed on the side of a first surface of a third substrate thereafter to implement a step of connecting the first surface of the third substrate to the second surface of the second substrate and a step of cutting off these first, second and third susbstrates every unit regions, thus to form sensors, respectively.

The fourth invention of this application is characterized in that, in the above-mentioned second invention, before the substrate is cut off every unit regions, a groove such that the working portion of the first substrate can move therein with a predetermined degree of freedom is further formed on the side of a first surface of a third substrate thereafter to implement a step of connecting the first surface of the third substrate to the first surface of the first substrate and a step of cutting off these first, second and third substrate every unit regions, thus to form sensors, respectively.

3

The fifth invention of this application is characterized in that, in the above-mentioned second invention, resistance elements are formed so as to enable detection of a force exerted on each working region with respect to at least two axis directions of three axis directions of a first axis and a second axis included in a plane defining the first surface of the first substrate and perpendicular to each other, and a third axis perpendicular to the first axis and the second axis.

In accordance with the first and second invention of this application, a weight body or a magnetic body is formed by a portion of a second substrate, and a pedestal for supporting a first substrate is formed by another portion of the second substrate. Namely, prior to implementation of the dicing process, the weight body, the magnetic body and the pedestal can be formed using a wafer as a unit. Further, in accordance with the third invention, prior to implementation of the dicing process, a control member for limiting a downward movement of the weight body or the magnetic body (In this application, these bodies will be generically referred to as working bodies, respectively.) can be formed by a third substrate. Furthermore, in accordance with the fourth invention of this application, prior to implementation of the dicing process, a control member for limiting an upward movement of the working portion of the first substrate can be formed by the third substrate. In addition, in accordance with the fifth invention of this application, since a force exerted on the working region with respect to at lest two axes of three axes perpendicular to each other can be detected, movement of the working body can be two-dimensionally or three-dimensionally grasped. Thus, a sensor for making a three-dimensional detection can be realized.

As stated above, since the greater part of processing is completed using a wafer as a unit prior to dicing process, an efficient sensor suitable for mass-production can be manufactured.

BRIEF DESCRIPTION OF THE DRAWINGS

FIGS. 4a to 4g are process diagrams showing a mehtod of manufacturing a main portion of an acceleration sensor according to an embodiment of this invention, respectively, FIGS. 12a and 12b are a side cross sectional view and a top view showing a control substrate used in a further embodiment of this invention, respectively.

DESCRIPTION OF THE PREFERRED EMBODIMENTS

This invention will now be described in accordance with preferred embodiments illustrated.

§ 0 Structure of sensor

Figure 1:
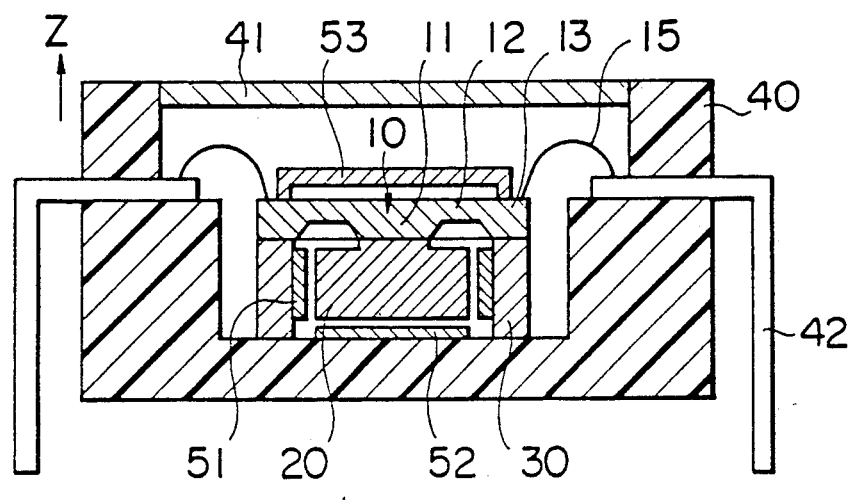
FIG. 1 is a side cross sectional view showing the structure of an acceleration sensor according to this invention.
Figure 2:
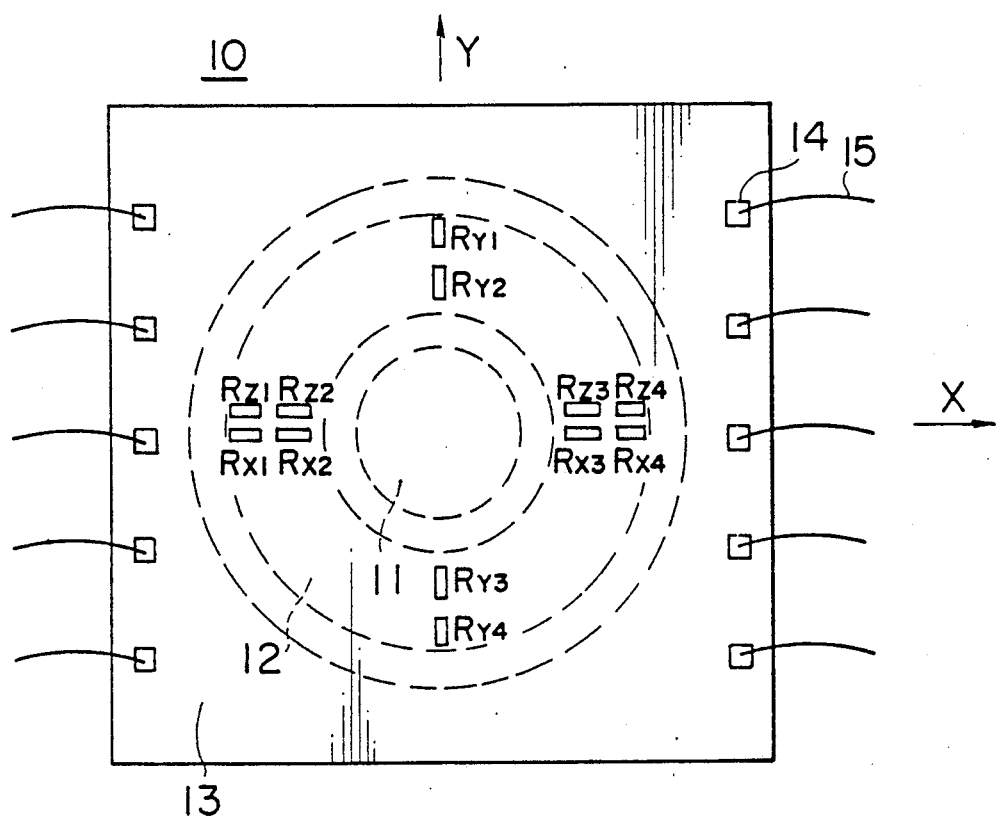
FIG. 2 is a top view of a semiconductor pellet constituting a portion of the sensor shown in FIG. 1.

The structure of a sensor using resistance element to which this invention is applied will be briefly described. FIG. 1 is a structual cross section showing an example of an acceleration sensor. This sensor includes a semiconductor pellet 10 serving as a main unit. The top view of this semiconductor pellet 10 is shown in FIG. 2. The cross section of the semiconductor pellet 10 shown at the central portion of FIG. 1 corresponds to the cross section cut along the X-axis of FIG. 2. This semiconductor pellet 10 is divided into three regions of a working portion 11, a flexible portion 12, and a fixed portion 13 in order from the inside toward the outside. As indicated by broken lines in FIG. 2, an annular groove is formed on the side of the lower surface of the flexible portion 12. By the presence of this groove, the flexible portion 12 virtually becomes thin in thickness, whereby this portion 12 is caused to have flexibility. Accordingly, when a force is applied to the working portion 11 under the state where the fixed portion 13 is fixed, the flexible portion 12 is bent. As a result, a mechanical deformation is produced. On the upper surface of the flexible portion 12, as shown in FIG. 2, resistance elements Rx1 to Rx4, Ry1 to Ry4 and Rz1 to Rz4 are formed in predetermined directions, respectively.

As shown in FIG. 1, a weight body 20 is connected to the lower part of the working portion 11 and a pedestal 30 is connected to the lower part of the fixed portion 13. The bottom surface of the pedestal 30 is connected to the inside bottom surface of a package 40. The semiconductor pellet 10 and the weight body 20 are supported by the pedestal 30. The weight body 20 is hanging down within the package 40. A cover 41 is fitted into the pakage 40. Furter, bonding pads 14 (shown in FIG. 2)

provided on the semiconductor pellet 10 are electrically connected to respective resistance elements within the pellet. These bonding pads 14 and leads 42 provided on the side portions of the package 40 are connected by means of bonding wires 15.

When an acceleration is applied to this sensor, an external force is exerted on the weight body 20. This external force is transmitted to the working portion 11, so a mechanical deformation is produced in the flexible portion 12. Thus, changes in the electric resistance values of the resistance elements are produced. These changes can be taken out to the external through the bonding wires 15 and the leads 42. The component in the X-direction of the force applied to the working portion 11 is detected on the basis of changes in the electric resistance values of the resistance elements $Rx1$ to $Rx4$, the component in the Y-direction thereof is detected on the basis of changes in the electric resistance values of the resistance elements $Ry1$ to $Ry4$, and the component in the Z-direction thereof is detected on the basis of change in the electric resistance values of the resistance element $Rz1$ to $Rz4$. Since the above-mentioned detection method is not the gist of this invention, its explanation is omitted here. In connection with the detail thereof, reference should be made to the Official Gazette of the International Laid Open No. WO88/08522 of the International Application based on the Patent Cooperation Treaty, or the like. It is to be noted that the above-described sensor is constructed as an acceleration sensor, but when there is a need to use the above-described sensor as a magnetic sensor, such a magnetic sensor may be constituted by using a magnetic body in place of the weight body 20.

In the case where the above-mentioned sensor is put into practice as an acceleration sensor, when a large acceleration is applied thereto, an excessive external force will be exerted on the weight body 20. As a result, a large mechanical deformation is produced in the flexible portion 12, leading to the possibility that the semiconductor pellet 10 might be broken. Further, in the case where a large magnetic field is applied to a magnetic sensor, the same phenomenon as above might occur. For the purpose of preventing such a breakage, control members 51, 52 and 53 are provided in the sensor shown in FIG. 1. The control member 51 serves to effect a control such that a displacement in the lateral direction of the weight body 20 does not exceed an allowed value. The control member 52 serves to effect a control such that a displacement in a downward direction of the weight body 20 does not exceed an allowed value. In addition, the control member 53 serves to effect a control such that a displacement in an upward direction of the weight body 20 (the working portion 11 in a direct sense) does not exceed an allowed value. Thus, even if an excessive external force is exerted on the weight body 20, whereby the weight body attempts to move in a manner such that a displacement produced exceeds the above-described allowed value, the weight body 20 will collide against these control members, so its movement is prevented. Eventually, there is no possibility that any mechanical deformation more than each allowed value is applied to the semiconductor pellet 10. Thus, the semiconductor pellet 10 is protected from being broken.

§ 1 Manufacturing process I of this invention

Figure 3A:
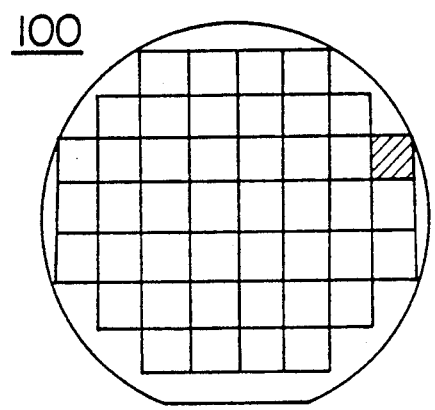
FIG. 3a is a diagram showing the state where unit regions are defined on a semiconductor wafer used in this invention.
Figure 3B:
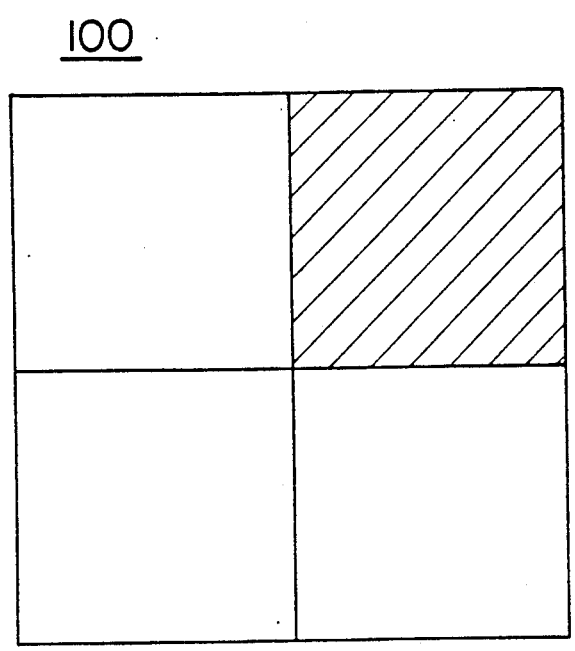
FIG. 3b is a diagram showing a simplified model where four unit regions are defined for convenience of explanation.

The process for manufacturing the sensor shown in FIG. 1 by a method according to this invention will now be described in detail. Initially, process steps up to the process step for dicing a wafer will be described. A plurality of unit regions are first defined on a semiconductor wafer. The semiconductor wafer is separately cut off every unit regions at a subsequent dicing step. As a result, these portions thus cut off independently serve as semiconductor pellets having a sensor function, respectively. FIG. 3a shows a plurality of unit regions formed on a semiconductor wafer 100. A hatched portion represents one unit region. These unit regions are square, respectively. As stated above, in practice, a large number of unit regions are formed on a disk-shaped semiconductor wafer. However, for brevity of explanation, by taking the example where four unit regions are formed on a square semiconductor wafer 100 as shown in FIG. 3b, an explanation will be made as follows.

Figure 4E:
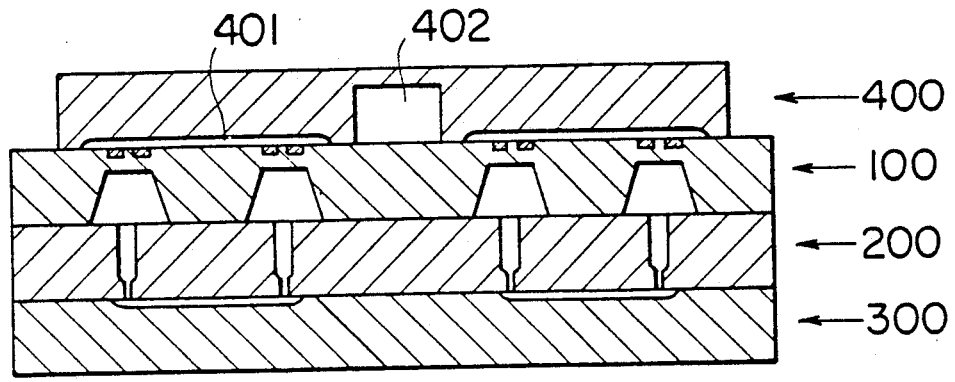

The process steps up to the dicing process step will now be described with reference to FIGS. 4a to 4g. As shown in FIGS. 5a and 5b, processing of the semiconductor wafer 100 of e.g., silicon, etc. is first carried out. Since this semiconductor wafer 100 is square and is divided into four unit regions for convenience of explanation as described above, completely the same processing is implemented to these four unit regions. FIG. 5b is a bottom view of the semiconductor wafer 100 to which processing has been implemented, and FIG. 5a is a side cross sectional view showing the state where the processed semiconductor wafer is cut along the cutting line 5a—5a. On the upper surface of the semiconductor wafer 100, a plurality of resistance elements R are formed at predetermined positions, respectively. This may be performed by the impurity diffusion process, etc. Further, on the lower surface thereof, grooves 101 are formed by the etching process, etc., thus allowing the thickness to be thin so as to have flexibility. In this embodiment, each groove 101 is formed circular as shown in FIG. 5b. Such an annular groove may be formed by a mechanical processing, an isotropic etching process, or a combination of isotropic and anisotropic etching. In the case of forming a diaphragm of a pressure sensor, the anisotropic etching process is ordinarily used. However, when the anisotropic etching is applied to this embodiment, a groove formed is not annular, but polygonal (the shape depends upon Miller indices of the semiconductor wafer 100). The inside portion of each groove 101 thus formed serves as a working portion 110, the outside portion thereof serves as a fixed portion 130, and the groove portion serves as a flexible portion 120. Accordingly, resistance elements R are just formed on these grooves. FIG. 4a shows the state that processing of the semiconductor wafer 100 has been completed.

Figure 6A:
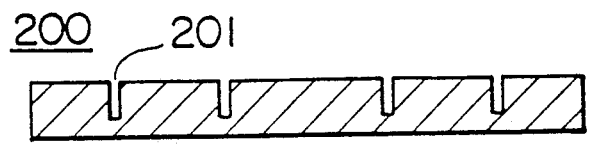
FIGS. 6a and 6b are a side cross sectional view and a top view showing an auxiliary substrate used in the method shown in FIGS. 4a to 4g, respectively.
Figure 6B:
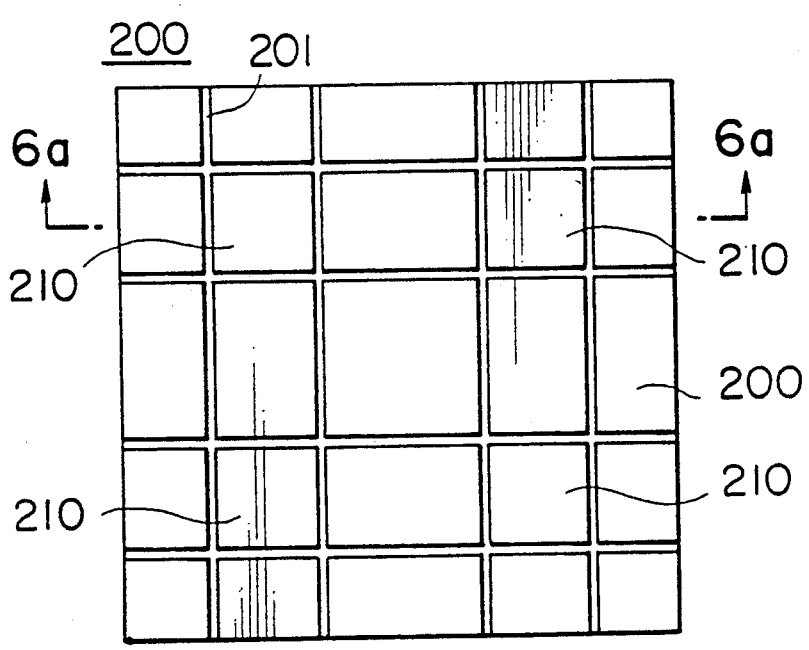

Subsequently, an auxiliary substrate 200 as shown in FIGS. 6a and 6b is prepared. Since a portion of the auxiliary substrate 200 finally constitutes a weight body and the remaining portion thereof finally constitutes a pedestal, it is preferable to use a material suitable for a weight body and a pedestal, respectively. In addition, since the auxiliary substrate 200 is connected to the semiconductor wafer 100, it is preferable to use a material having substantially the same coefficient of thermal expansion as that of the semiconductor wafer 100. For example, it is preferable to use a silicon substrate which is the same as the semiconductor wafer 100, or a glass substrate. FIG. 6b is a top view of the auxiliary substrate 200 to which processing has been implemented, and FIG. 6a is a side cross sectional view showing the state where the processed auxiliary substrate 200 is cut along the cutting line 6a—6a. In this way, grooves 201 are longitudinally and laterally formed on the side of the upper surface of the auxiliary substrate 200. The provision of such grooves allow this substrate to be easily subjected to dicing later. In short, the positions where grooves 201 are formed may be positions such that portions 210 (four portions in the figure) each corresponding to the working portion 110 of the semiconductor wafer 100 and portions 220 (other portions) each corresponding to the fixed portion 130 are separated from each other. In other words, after mounting and connecting the auxiliary substrate 200 on the semiconductor wafer 100, it is sufficient to cut only the auxiliary substrate 200 along the grooves 201, in order to separate auxiliary substrate 200 into the weight bodies (portions 210) and the pedestals (portions 220). When such an auxiliary substrate 200 is thus prepared, this auxiliary substrate 200 is connected to the semiconductor wafer 100 as shown in FIG. 4b. While such a connection may be made by a bonding agent, it is preferable for securely making a connection to use an anodic bonding capable of directly connecting materials to each other. Namely, this method is to apply a voltage across both materials to raise temperatures of the both materials to connect them while applying a force thereto.

Subsequently, as shown in FIG. 4c, the auxiliary substrate 200 is cut along the grooves 201 by means of a dicing blade. Cutting paths 202 are formed on the side opposite to the grooves 201 (the lower part in the figure). Thus, portions 210 (serving as weight bodies) and portions 220 (serving as pedestals) are completely cut off. As shown in FIG. 6b, portions 210 (weight bodies) are positioned at four places. These portions are placed in the state where they are connected only to working portions 110 shown in FIG. 5b. Further, other portions 220 (pedestals) are placed in the state where they are connected only to fixed portions 130 shown in FIG. 5b. It is to be noted that since the flexible portion 120 is in a floating state with respect to the auxiliary substrate 200, it is not connected to any portion. By dicing the auxiliary substrate 200 in this way, the weight body 210 and the pedestal 220 can be formed at the same time. In this embodiment, the pedestal 220 not only performs a function as a pedestal supporting the fixed portion 130, but also performs a function as a control member to effect a control so that a displacement in a lateral direction of the weight body 210 does not exceed an allowed range (function of the control member 51 in the sensor shown in FIG. 1). This allowed range is determined by the width of the cutting path 202 (when the width of the groove 201 is smaller than that of the cutting path 202, the allowed range is determined by the width of the groove 201). It is to be noted that the dicing process implemented here is the dicing process for only the auxiliary substrate 200, and therefore the semiconductor wafer 100 is still in the state of a single wafer.

Figure 7A:
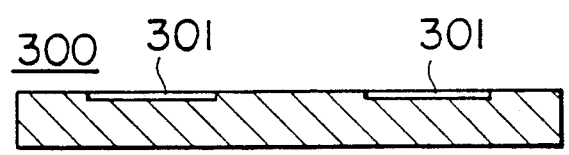
FIGS. 7a and 7b are a side cross sectional view and a top view showing a control substrate used in the method shown in FIGS. 4a to 4g, respectively.
Figure 7B:
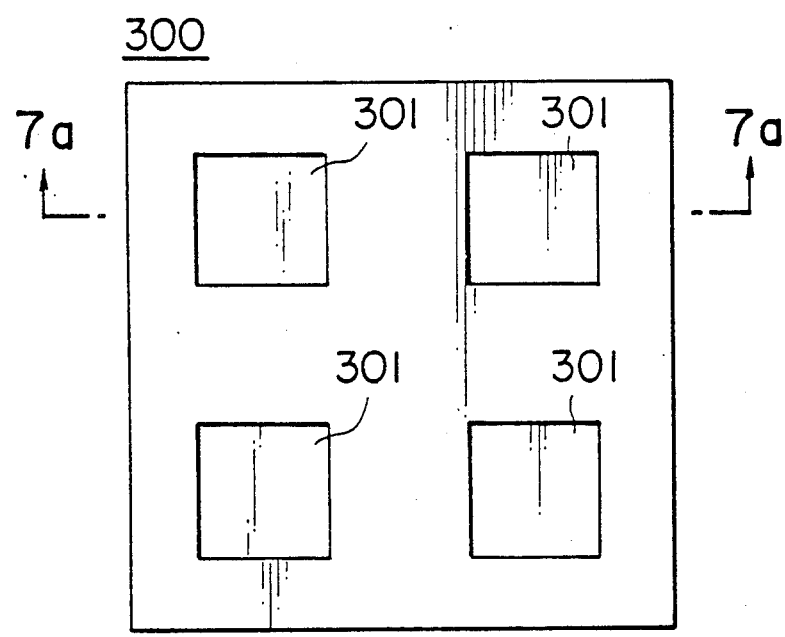

A control substrate 300 as shown in FIGS. 7a and 7b is then prepared. This control substrate 300 serves to control a displacement in a downward direction of the weight body 210 so that it falls within an allowed range. As the material of the control substrate 300, a silicon substrate or a glass substrate may be used in the same manner as the auxiliary substrate 200. Completely the same processing is implemented to respective four unit regions on the upper surface of the control substrate 300. FIG. 7b is a top view of the control substrate 300 to which process has been implemented, and FIG. 7a is a side cross sectional view showing the state where the processed control substrate is cut along the cutting line 7a—7a. On the side of the upper surface thereof, four square grooves 301 are formed. Such grooves 301 serve to control, the degree of freedom in a downward direction of a displacement of the weight body 210. The degree of freedom is determined by depth of the groove 301. As shown in FIG. 4d, this control substrate 300 is connected to the auxiliary substrate 200. It is preferable for this connection to use an anodic bonding.

Figure 8A:
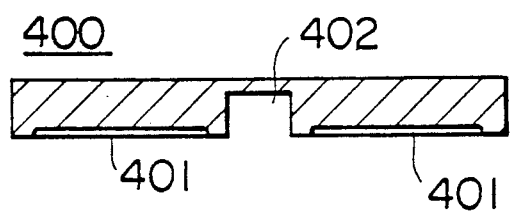
FIGS. 8a and 8b are a side cross sectional view and a bottom view showing another control substrate used in the method shown in FIGS. 4a to 4g, respectively.
Figure 8B:
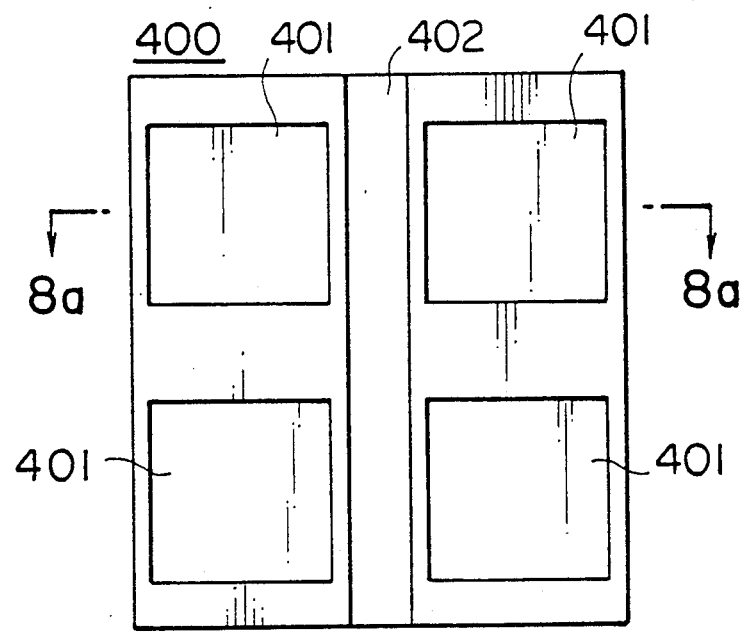

A control substrate 400 as shown in FIGS. 8a and 8b is then prepared. This control substrate 400 serves to control a displacement in an upward direction of the working portion 110 so that it falls within an allowed range. As a material of the control substrate 400, a silicon substrate or a glass substrate may be used in the same manner as auxilliary substrate 200. Completely the same processing is implemented to respective four unit regions on the lower surface of the control substrate 400. FIG. 8b is a bottom view of the control substrate 400 to which processing has been implemented, and FIG. 8a is a side cross sectional view showing the state where the processed control substrate is cut along the cutting line 8a—8a. On the side of the lower surface thereof, four square grooves 401 are formed. Such grooves 401 serve to control the degree of freedom in an upward direction of a displacement of the working portion 110. The degree of freedom is determined by depth of the groove 401. Another feature of the control substrate 400 resides in that the lateral width is somewhat shorter than those of other substrates, and that a longitudinally elongated groove 402 is formed at the central portion thereof. This is a device for facilitating wire bonding as described later. As shown in FIG. 4e, this control substrate 400 is connected to the upper surface of the semiconductor wafer 100. Also for this connection, it is preferable to use an anodic bonding.

Figure 4F:
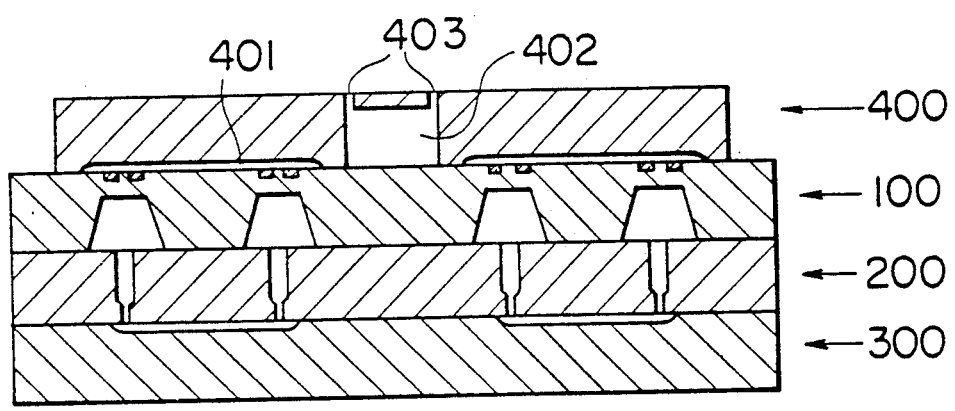
Figure 4G:
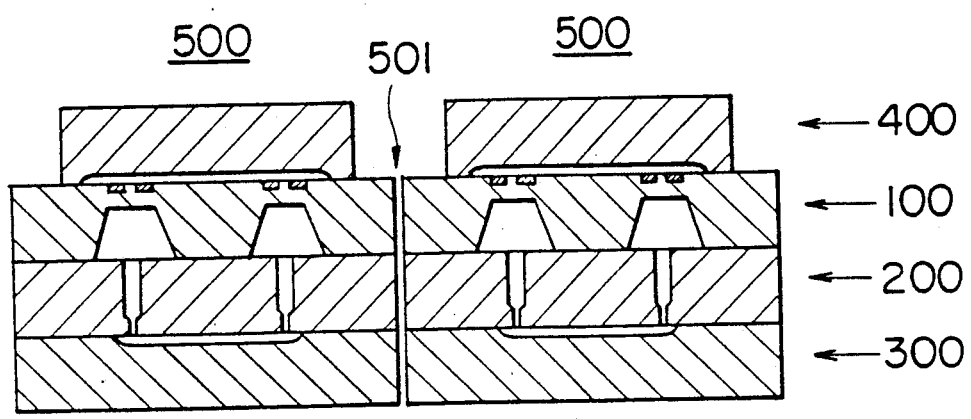
Figure 5A:
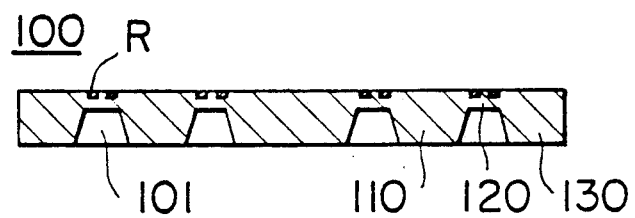
FIGS. 5a and 5b are a side cross sectional view and a bottom view showing a semiconductor wafer used in the method shown in FIGS. 4a to 4g, respectively.
Figure 5B:
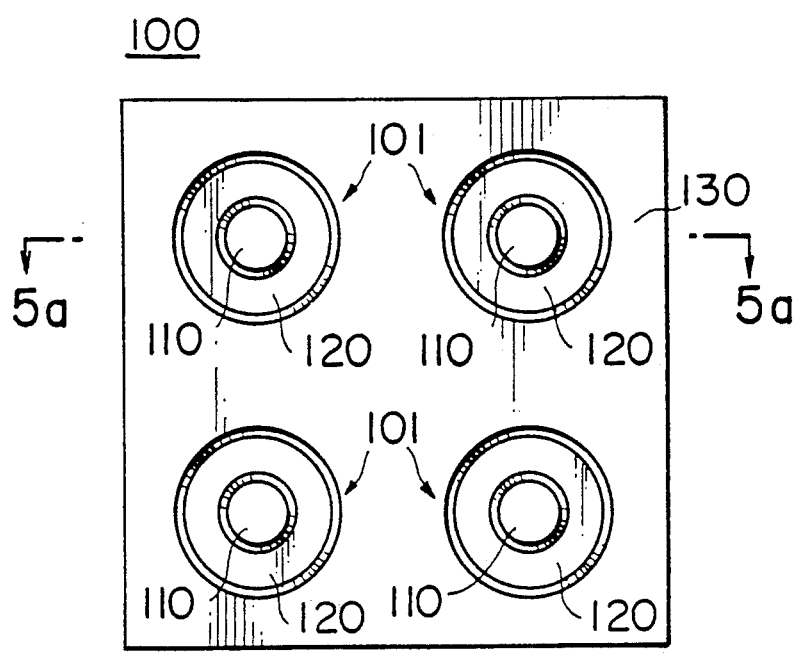
Figure 9:
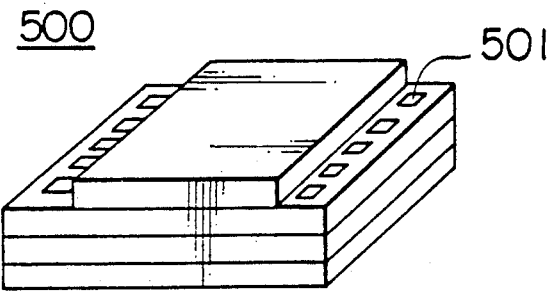
FIG. 9 is a perspective view showing a main portion of an acceleration sensor manufactured by the method shown in FIGS. 4a to 4g.

Thereafter, as shown in FIG. 4f, the upper part of the groove 402 is cut by a cutting path 403. Further, when respective unit regions are cut along cutting path 501 as shown in FIG. 4g, four unit regions shown in FIG. 3b are separated from each other. Thus, sensor main portions 500 are completed. The perspective view of the sensor main portion 500 thus completed is shown in FIG. 9. The reason why the lateral width of the control substrate 400 is formed short and longitudinally elongated grooves 402 are formed is nothing but aiming at exposing the bonding pads 501 as shown in FIG. 9.

§ 2 Manufacturing process II of this invention

Figure 10:
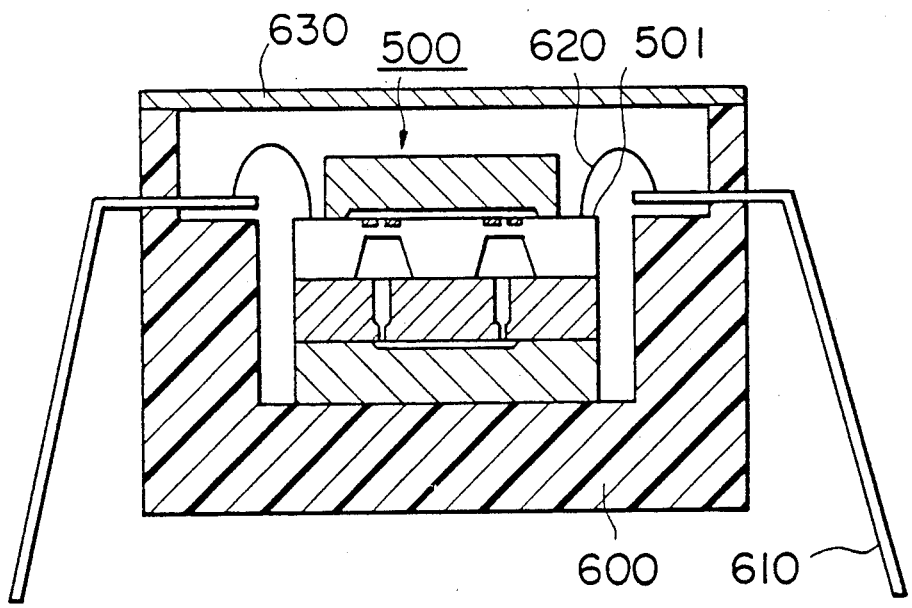
FIG. 10 is a side cross sectional view showing the state where the main portion shown in FIG. 9 is accommodated in a package.

Next, the process after the wafer has been subjected to dicing will now be described. The sensor main portion 500 obtained as shown in FIG. 9 is accomodated into a package 600 as shown in the side cross sectional view of FIG. 10. Namely, this is accomplished by bonding the bottom portion of the sensor main portion 500 to the inner portion of the package 600. Mounting leads are attched to the package 600. The bonding pads 501 and the inside ends of leads 610 are subjected to bonding by means of bonding wires 620. Thereafter, a cover 630 is fitted over the package 600 and is sealed. An acceleration sensor is thus completed.

As state above, the manufacturing process every pellets after dicing (the above-described manufacturing procesS II) is very simple as compared to the manufacturing process every wafer (the above-described manufacturing process I). Namely, in accordance with this invention, most of manufacturing steps can be carried out every wafer, and an efficient manufacture suitable for mass production can be made.

§ 3 Other embodiments

This invention has been described in connection with the embodiment illustrated. However, this invention is not limited to the above-mentioned embodiment, but may be implemented in various forms. Embodiments in other forms will be described below.

(1) In the above-described embodiment, the processes for connection of control substrates 300 and 400 are required. However, the fundamental idea of this invention resides in that the weight body and the pedestal are formed by means of the auxiliary substrate 200. Accordingly, the processes for connection of the control substrates 300 and 400 are not necessarily required. The first invention described in the scope of the patent claim 1 of this application is the invention based on the above-mentioned fundamental idea, and therefore connection of the control substrate is not recited as the constitutional element. The second invention described in the patent claim 2 thereof is characterized in that the process for connecting the control substrate 300 is further added to the first invention. Further, the third invention described in the patent claim 3 is characterized in that the process for connecting the control substrate 400 is further added to the first invention.

(2) While the method of manufacturing an acceleration sensor has been explained in the above-described embodiment, completely the same process as above may be carried out also in the case of manufacturing a magnetic sensor. It is to be noted that the working body for applying a force to the working portion is weight body 210 in the case of the acceleration sensor, whereas the working body must be a magnetic body in the case of the magnetic sensor. Accordingly, a magnetic material or a material including a magnetic material is used as a material of the auxiliary substrate 200.

(3) In the case of the auxiliary substrate 200 shown in FIG. 6, grooves 210 are formed in advance. Such grooves 201 serve to facilitate the work for cutting the auxiliary substrate 200 at the subsequent process, and therefore they are not necessarily required. Accordingly, if the auxiliary substrate 200 can be satisfactorily cut later, grooves 201 are unnecessary.

(4) In the case of the control substrate 300 shown in FIG. 7, square grooves 301 are formed for every respective unit region. In place of such grooves, there may be used a control substrate 300' including elongated grooves 302 formed over unit regions as shown in FIGS. 12a and 12b.

Figure 11:
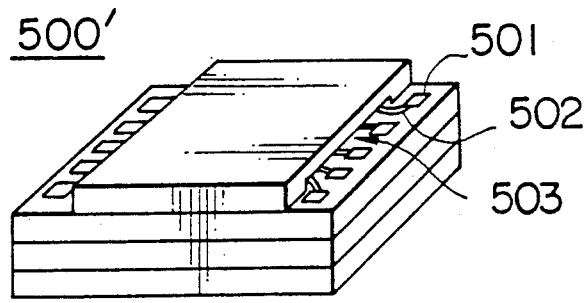
FIG. 11 is a perspective view showing an acceleration-sensor-main-portion manufactured by a method according to another embodiment of this invention.
Figure 13A:
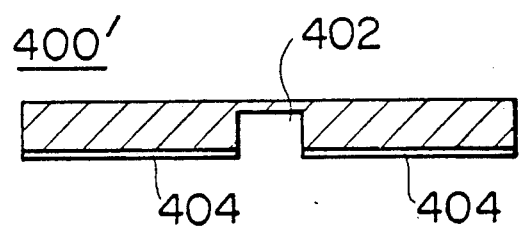
FIGS. 13a and 13b are a side cross sectional view and a bottom view showing a control substrate used for manufacturing the main portion shown in FIG. 11, respectively.
Figure 13B:
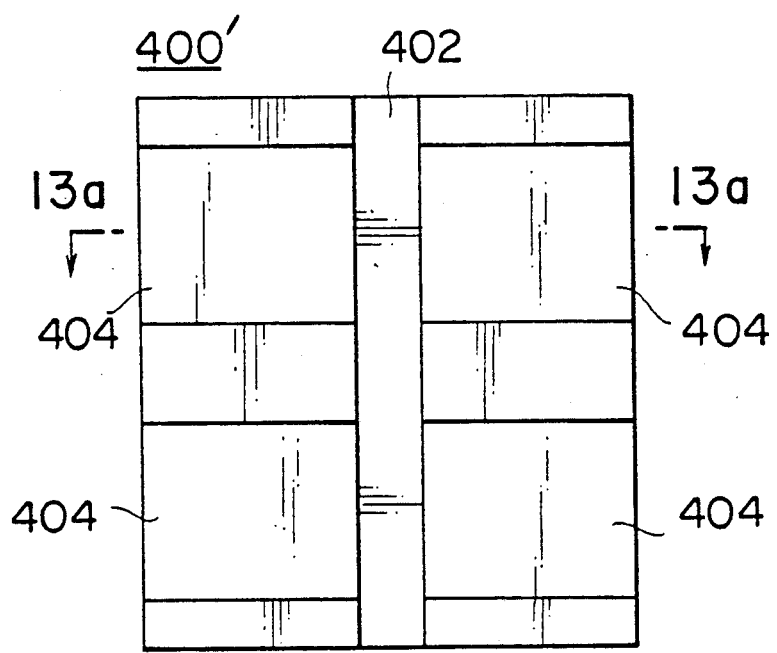

(5) In the above-described embodiment, as shown in FIG. 9, electrical connection between bonding pads 501 and resistance elements R (not shown in FIG. 9) is made of a diffused layer within the semiconductor wafer. On the contrary, in the case of the type to form wiring layers 502 comprised of aluminum, etc. on a surface of a wafer, it is required to ensure gaps 503 for respective wiring layers 502 as shown in FIG. 11. In this case, in place of the control substrate 400 shown in FIG. 8, it is sufficient to use a control substrate 400' including grooves 404 as shown in FIGS. 13a and 13b.

(6) In the above-described embodiment, for brevity of explanation, reference has been made to the embodiment for manufacturing four sets of sensor main portions using the square wafer shown in FIG. 3b. In practice, a larger number of sensor main portions can be manufactured by using a disk-shaped wafer as shown in FIG. 3a.

(7) In the above-described embodiment, a space around the weight body 210 is filed with air. When a silicon oil, etc. is sealed into the space, the effect for absorbing impact or vibration, that is, damping effect is provided. Thus, impact resisting characteristic and/or vibration resisting characteristic are improved.

Figure 14:
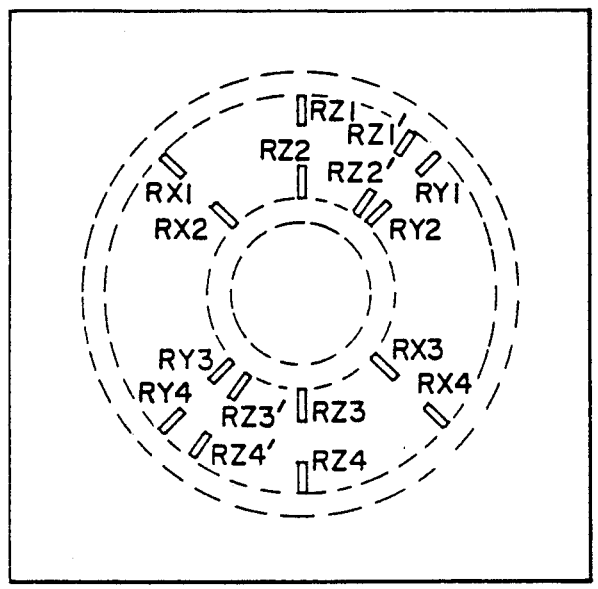
FIG. 14 is a diagram showing an example of a mask suitable for use in a process for forming resistance elements in this invention.

(8) In the case of forming a plurality of resistance elements R on the upper surface of the semiconductor wafer 100, it is convenient to prepare a mask 700 to form resistance elements R as shown in FIG. 14. In this figure, broken lines represent a region corresponding to the portion where the thickness of the semiconductor wafer 100 is thin, and portions indicated by symbols R with suffix represent window portions opened in the mask in order to form respective resistors R, respectively. This mask 700 is characterized in that two sets of resistance elements for detecting a force in the Z-axis direction can be formed. Namely, both the first set of $Rz1$ to $Rz4$ and the second set of $Rz1'$ to $Rz4'$ can be formed. Whether either of two sets is used is determined by Miller indices of the semiconductor wafer 100. The mask 700 has a mask pattern suitable for a wafer of (111) plane, a wafer of (110) plane, and a wafer of (100) plane of silicon. It is preferable to use the first set of resistance elements in the case of the wafer of (110) plane, and to use the second set thereof in the case of the wafer of (100) plane. In addition, in the case of the wafer of (111) plane, either set may be used. This is because the condition as to in which direction resistance elements should be arranged in order that the detection sensitivity with respect to the stress becomes satisfactory varies depending upon Miller indices of wafers used. Accordingly, the arrangement of resistance elements shown in FIG. 2 is only an example. In practice, an optimum arrangement is preferably employed depending upon Miller indices of a wafer used.

Figure 15:
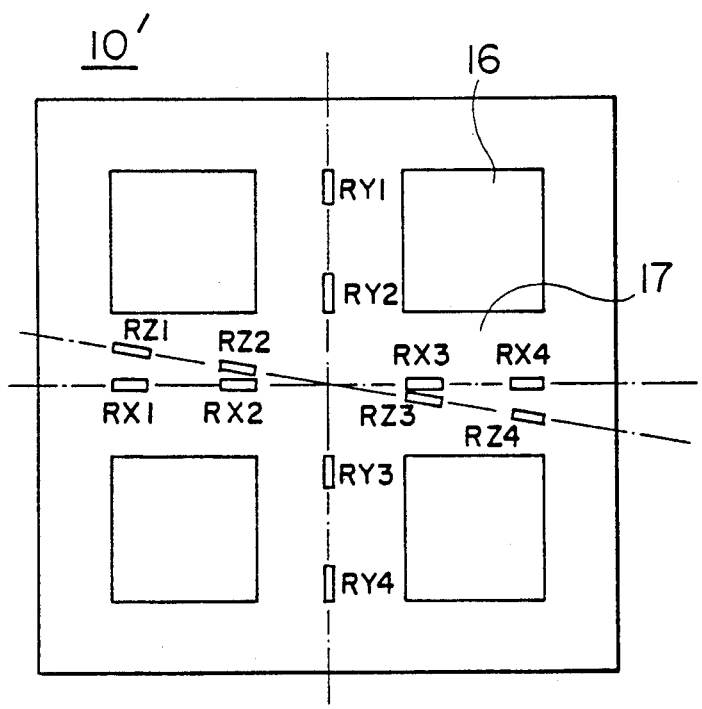
FIG. 15 is a top view of a semiconductor pellet used in a sensor according to a further different embodiment of this invention.

(9) It cannot be said that only the sensitivity of the resistance element varies depending upon Miller indices. The etching characteristics also depends upon Miller indices. In the embodiment shown in FIG. 2, an annular groove is dug by etching on the side of the lower surface of the semiconductor pellet 10 to form flexible portion 12. However, in the case where the anisotropic etching process is used, it is difficult to annularly dig a silicon wafer. For example, in the case of a wafer of (110) plane, when an attempt is made to form an annular groove by etching, there is a tendency that a square groove is formed. For forming an annular groove, it is suitable to use a mechanical processing or an isotropic etching processing or a combination of isotropic and anisotropic etching process. In the case of carrying out the combination of isotropic and anisotropic etching process, etch stop technology is used, thereby making it possible to form more steep annular groove. As the means for forming the flexible portion, a method of providing through-holes may be used in addition to the method of forming grooves. In short, any method may be used if flexibility can be given by the partially removing processing. An embodiment where a flexible portion is formed by the method of providing through-holes is shown in FIG. 15. In this semiconductor pellet 10' square through-holes 16 are provided at four portions, whereby bridge portions 17 are formed. These flexible portions 17 have flexibility and resistance elements are formed thereon. It is of course possible that square grooves may be formed instead of through-hole 16.

Figure 16A:
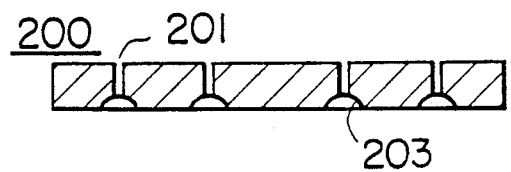
FIGS. 16a and 16b are a side cross sectional view and a top view showing a still further embodiment of this invention, respectively.
Figure 16B:
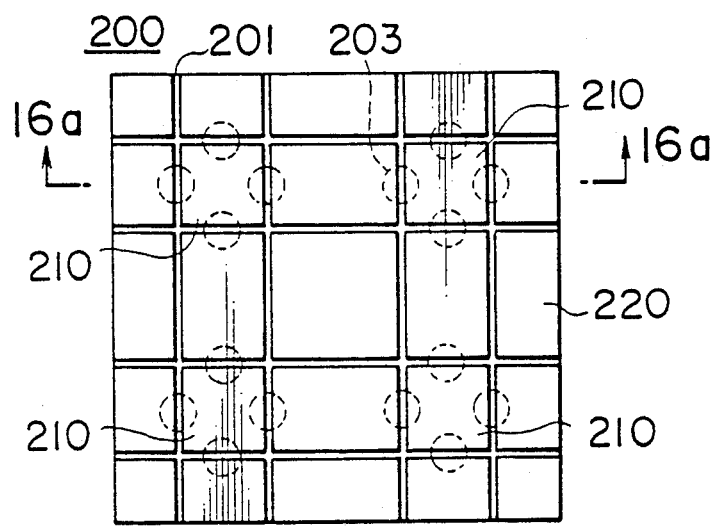

(10) In the process shown in FIG. 4c, the auxiliary substrate 200 is cut along the grooves 201 by the dicing blade to thereby form cutting paths 202. At this time, it is not preferable that shavings are entered into grooves 201. Therefore, it is preferable to further form grooves for escaping shavings at the time of dicing. FIGS. 16a and 16b show an embodiment where such grooves 203 are formed on the side of the lower surface of the auxiliary substrate 200. FIG. 16b is a top view of this embodiment and FIG. 16a is a side cross sectional view cut along the cutting line 16a—6a of FIG. 16b. These grooves 203 do not give any obstacle to the function as the control member of the pedestal 220. Shavings at the time of dicing drop down through these grooves 203. Thus, shavings are prevented from being entered into grooves 201.

Figure 17:
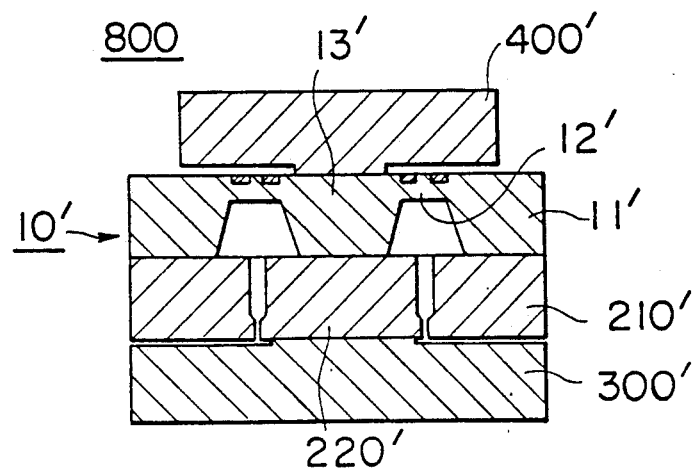
FIG. 17 is a side cross sectional view of an acceleration sensor according to a still more further embodiment of this invention.

(11) In the acceleration sensor of which structure is shown in FIG. 1, the central portion of the semiconductor pellet 10, the peripheral portion thereof, and the portion therebetween serve as the working portion 11, the fixed portion 13, and the flexible portion 12, respectively. On the contrary, referring to FIG. 17, there is shown, as a cross sectional view, a main portion 800 of an acceleration sensor including a semiconductor pellet 10' having the central portion, the peripheral portion, and the intermediate portion therebetween as a fixed portion 13', a working portion 11', and a flexible portion 12', respectively. In the acceleration sensor of such a structure, a pedestal 220' is connected to the lower part of the fixed portion 13' positioned in the center, and the pedestal 220' is connected to a control substrate 300'. Further, a control substrate 400' is connected to the upper part of the fixed portion 13'. Accordingly, the weight body 210' is positioned around the pedestal 220'. As a result, since the weight body 210' is virtually large than the weight body 210 in the above-described embodiment, sensitivity of the sensor can be improved. The sensor main portion 800 of a structure as shown in FIG. 17 may be manufactured by substantially the same method as those of the above-described methods.

(12) While the above-described embodiments are all directed to three-dimensional sensors for detecting an acceleration in three axis directions of X, Y and Z, this invention may be similarly applied to two-dimensional or one-dimensional sensors.

What is claimed:

1. A method of manufacturing a sensor using a resistance element, comprising:
   a step of defining, on a first substrate, a working region, a fixed region, and a flexible region positioned therebetween,
   a step of forming a resistance element within said flexible region on a first surface of said first substrate,
   a step of partially removing said first substrate in order to allow said flexible region to have flexibility,
   a step of connecting a second substrate to a second surface of said first substrate, and
   a step of cutting said second substrate to thereby form a working body connected to said working region of said first substrate and constituted by a portion of said second substrate and a pedestal connected to said fixed region of said first substrate and constituted by a portion of said second substrate.

2. A method of manufacturing a sensor using a resistance element, comprising:
   a step of defining a plurality of unit regions on a first substrate, and defining, within each unit region, a working region, a fixed region and a flexible region positioned therebetween,
   a step of forming resistance elements within said respective flexible regions on a first surface of said first substrate,
   a step of partially removing said first substrate in order to allow said respective flexible regions to have flexibility,
   a step of connecting a second substrate to a second surface of said first substrate,
   a step of cutting said second substrate to thereby form, within each unit region, a working body connected to said working region of said first substrate and constituted by a portion of said second substrate, and a pedestal connected to said fixed region of said first substrate and constituted by a portion of said second substrate, and
   a step of cutting off said first and second substrates of every unit region to form independent sensors, respectively.

3. A method of manufacturing a sensor using a resistance element, comprising:
   a step of defining a plurality of unit regions on a first substrate, and defining, within each unit region, a working region, a fixed region, and a flexible region positioned therebetween,
   a step of forming resistance elements within said respective flexible regions on a first surface of said first substrate,
   a step of partially removing said first substrate in order to allow said respective flexible regions to have flexibility,
   a step of connecting a first surface of a second substrate to a second surface of said first substrate,
   a step of cutting said second substrate to thereby form, within each unit region, a working body connected to said working region of said first substrate and constituted by a portion of said second substrate, and a pedestal connected to said fixed region of said first substrate and constituted by a portion of said second substrate,
   a step of forming, on the side of a first surface of a third substrate, a groove such that said working body can move with a predetermined degree of freedom thereafter to connect said first surface of said third substrate to a second surface of said second substrate, and
   a step of cutting off said first, second and third substrates of every unit region to form independent sensors, respectively.

4. A method of manufacturing a sensor using a resistance element, comprising:
   a step of defining a plurality of unit regions on a first substrate, and defining, within each unit region, a working region, a fixed region, and a flexible region positioned therebetween,
   a step of forming resistance elements within said respective flexible regions on a first surface of said first substrate,
   a step of partially removing said first substrate in order to allow said respective flexible regions to have flexibility,
   a step of connecting a first surface of a second substrate to a second surface of said first substrate.
   a step of cutting said second substrate to thereby form, within each unit region, a working body connected to said working region of said first substrate and constituted by a portion of said second substrate, and a pedestal connected to said fixed region of said first substrate and constituted by a portion of said second substrate, a step of forming, on the side of a first surface of a third substrate, a groove such that said working portion of said first substrate can move with a predetemined degree of freedom thereafter to connect said first surface of said third substrate to said first surface of said first substrate, and a step of cutting off said first, second and third substrates of every unit regions to form independent sensors, respectively.

5. A method of manufacturing a sensor using a resistance element comprising:

a step of defining a plurality of unit regions on a first substrate, and defining, within each unit region, a working region at a central portion of each unit region, a flexible region around said working region, and a fixed region around said flexible region, respectively, a step of forming resistance elements within said respective flexible regions on a first surface of said first substrate so as to enable detection of a force exerted on said each working region with respect to at least two axis directions of three axis directions of a first axis and a second axis included in a plane defining said first surface of said first substrate and perpendicular to each other, and a third axis perpendicular to said first axis and said second axis, a step of partially removing said first substrate in order to allow said respective flexible regions to have flexibility, a step of connecting a first surface of a second substrate to a second surface of said first substrate, a step of cutting said second substrate to form, within each unit region, a working body connected to said working region of said first substrate and constituted by a portion of said second substrate, and a pedestal connected to said fixed region of said frist substrate and constituted by a portion of said second substrate, and a step of cutting off said first substrate and said second substrate of every unit region to form independent sensors, respectively.

* * * * *